United States Patent [19]

Wichterle et al.

[11] 4,076,691

[45] Feb. 28, 1978

[54] POLYACRYLATES CONTAINING PRIMARY AMINO GROUPS

[75] Inventors: Otto Wichterle; Jiri Coupek, both of Prague, Czechoslovakia

[73] Assignee: Ceskoslovenska akademie ved, Prague, Czechoslovakia

[21] Appl. No.: 745,967

[22] Filed: Nov. 29, 1976

Related U.S. Application Data

[63] Continuation-in-part of Ser. No. 383,044, Jul. 27, 1973, abandoned.

[30] Foreign Application Priority Data

Aug. 18, 1972 Czechoslovakia .................... 5741-72

[51] Int. Cl.$^2$ ........................... C08F 6/06; C08F 8/12; C08F 12/08; C08F 26/02
[52] U.S. Cl. ........................ 260/47 UA; 260/33.4 R; 260/33.6 UA
[58] Field of Search ..... 260/47 UA, 33.4 R, 33.6 UA

[56] References Cited

U.S. PATENT DOCUMENTS 3,425,988  2/1969  Gorman et al. ....................... 260/47

*Primary Examiner*—Lester L. Lee

[57] ABSTRACT

A polymeric material containing primary amino groups is prepared by copolymerizing an acylaminophenoxy acrylate or methacrylate with a hydroxyalkyl ester or an amide of acrylic or methacrylic acid, and treating the resulting copolymeric material with a hydrolytic agent to convert the acylamino groups into primary amino groups. Such monomeric materials may also be copolymerized with a crosslinking agent comprising an ester or an amide containing two or more acryloyl or methacryloyl groups.

19 Claims, No Drawings

POLYACRYLATES CONTAINING PRIMARY AMINO GROUPS

RELATED APPLICATION

The present application is a continuation-in-part of application Ser. No. 383,044 filed July 27, 1973 and now abandoned, the disclosure of which is incorporated herein as if more fully set forth.

This invention relates to the preparation of new copolymers containing primary aromatic amino groups.

The versatile reactivity of the primary aromatic amino group has created the development of an interest in polymers containing this amino group as starting materials for numerous technically important compositions. Such polymers may be suitably modified by polymer-analogous reactions of this functional group.

A number of polymeric compounds containing the primary aromatic amino group in their structure are known. Aniline-formaldehyde resins formed by the condensation of aniline with formaldehyde are unsuitable for further chemical transformations because of their great sensitivity to hydrolysis. The same disadvantage is possessed to some extent by derivatives of polysaccharides, e.g. cellulose, where the residue containing the primary aromatic amino group — formed by reduction of the corresponding polymeric nitro derivative — is linked by an ester or ether bond. Some other polymeric aromatic amino compounds have also been prepared by reduction of the corresponding polymeric nitro compounds such as the polymeric nitroaromatic derivatives of unsaturated acids, e.g. the nitroanilide of acrylic acid. Also, amino derivatives of polystyrene have been prepared by reduction of the corresponding nitro compounds.

Compounds of the present type cannot be readily prepared by free-radical polymerization of monomers already containing a free aromatic amino group because this group is noted for its strong inhibition activity. This fact considerably complicates even the preparation of polymers from monomers containing an aromatic nitro group by free-radical polymerization. The preparation of polymers containing aromatic amino groups by some polymer-analogous reactions, e.g. by reduction of a nitro group, is usually not quantitative and often gives only poorly defined products.

The object of this invention is to provide new copolymers which contain primary aromatic amino groups.

In accordance with the invention, a polymeric material containing primary amino groups is prepared by copolymerizing a minor amount by weight of a monomer having the general formula:

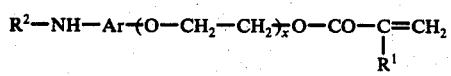

wherein
R$^1$ is selected from the group consisting of H and CH$_3$,
Ar is a bifunctional aromatic residue,
R$^2$ is an acyl group, and
x is 1 to 20,
and a major amount by weight of a comonomer selected from the group consisting of a hydroxyalkyl ester of acrylic acid, a hydroxyalkyl ester of methacrylic acid, an amide of acrylic acid, an amide of methacrylic acid, and styrene, the copolymerization being conducted at an elevated temperature; and thereafter treating the resulting copolymeric material with a hydrolytic agent selected from the group consisting of a strong mineral acid and a strong mineral base to convert the acylamino groups into primary amino groups.

The ratio of such comonomer to such monomer may vary considerably in accordance with the specific properties desired in the resulting copolymer provided that, as indicated, the amount of the comonomer is greater than the amount of the monomer by weight. Preferably, the comonomer is utilized in an amount from 2 to 30 times that of the monomer by weight. The bifunctional aromatic residue may comprise, for example, a phenyl or a naphthyl group having two free bonds. Desirably, the acyl group comprises an acetyl or a benzoyl group. Advantageously, the copolymerization is conducted at a temperature ranging from 60° C. to 90° C. The hydrolytic agent may comprise a strong mineral acid such as hydrochloric acid or sulphuric acid, or a strong mineral base such as sodium hydroxide or potassium hydroxide.

Such copolymers, which possess a wide range of physical and chemical properties, can be economically prepared in the indicated manner with high reproducibility. Those copolymers, which are hydrophilic in nature and enable, after swelling in water, the access of hydrolytic and other agents which would otherwise affect only aromatic amino groups occurring at the very surface, are especially important because of the relative ease of the further chemical transformation of such amino groups.

The present copolymers may also be prepared in a three-dimensional crosslinked form when a monomer with two or more polymerizable bonds is used as a further component of the copolymerizable mixture. Such a crosslinking agent advantageously comprises an ester containing at least two acryloyl or methacryloyl groups, an amide containing at least two acryloyl or methacryloyl groups, or divinyl benzene. The amount of the crosslinking agent may vary considerably, according to the properties desired in the final product, with an amount up to 70% by weight based on the total weight of the monomer and the comonomer generally being employed.

The copolymers of the invention are useful for various purposes such as supports for chemical bonding of molecules. More particularly, they have utility as carriers of immobilized enzymes, inhibitors, antigenes, antibodies etc. attached via diazonium isocyanate or isothiocyanate groups (see O. Zaborsky, Immobilized Enzymes CRC Press, Cleveland, Ohio 1973 p. 10–11).

The indicated three-dimensional copolymerization results in the formation of heterogeneous macroporous materials when such copolymerization is conducted in the presence of an organic solvent in which the resulting copolymer is soluble or which precipitates such copolymer. Solvents in which the copolymer are soluble are aromatic hydrocarbons or lower alcohols such as cyclohexanol, toluene etc.; and solvents which precipitate the polymer are higher alcohols such as dodecylalcohol. The resulting material has a large inner surface (as high as several hundred m$^2$/g) and a permanent porosity. Three-dimensional heterogeneous polymerization in a disperse medium such as in suspension form in the presence of water is of particular technical interest because the resulting porous material is obtained in the form of globular particles, which find broad application especially as chromatographic gels and filters and in chromatographic exchange operations.

The preparation of the present copolymers is illustrated in the following examples, in which all parts are by weight unless otherwise specified.

EXAMPLE 1

A solution consisting of 1 part of 2-(p-acetominophenoxy)-ethyl methacrylate, 20 parts of 2(β-hydroxyethyoxy) ethyl methacrylate and 1 part of azobisisobutyronitrile in 100 parts of ethanol was heated to 75° C. for 10 hours. To hydrolyze the copolymer formed, the solution was heated after addition of 1 part of sodium hydroxide dissolved in 1 part of water at the same temperature for another hour. The hydrolyzed copolymer was isolated from the solution by precipitation with ether.

EXAMPLE 2

A mixture consisting of 66 parts of 2-hydroxyethyl methacrylate, 30 parts of anhydrous glycerol, 3 parts of 2-(p-acetaminophenoxy)ethyl methacrylate, 0.2 part of ethylene dimethacrylate and 0.8 part of ethylazobisisobutyrate was poured into a mold formed by two coplanar glass plates separated at the circumference by a 1 mm. thick silicone rubber tube. The mold was inserted into a water bath heated to 65° C. for 5 hours. The circumferential tube was removed, and the mold with the copolymer was left for 20 hours in water. It was then dismantled without difficulty, and the resulting copolymer foil was separated from the glass plates. The foil was clear and colorless after washing out the glycerol and an equilibrium swelling in water. The foil was treated for 10 hours in 2.5N hydrochloric acid, the resulting gel containing free aromatic amino groups, as proved by diazotization with nitrous acid and coupling with resorcinol.

EXAMPLE 3

A mixture consisting of 33.5 parts of 2-hydroxyethyl methacrylate, 32 parts of ethylene dimethacrylate, 16 parts of 2-(p-acetaminophenoxy)ethyl acrylate, and 1 part of dibenzoyl peroxide in 100 parts of toluene was heated to a boil. The polymerization was finished after 5 hours; and the copolymer was separated in the form of fine white globules by suction. The hydrolysis of the copolymer was carried out in 5% KOH at 100° C. for 1 hour. The resulting polymeric material was characterized by its pore distribution, its high inner surface area, and the reactivity of its free amino groups.

EXAMPLE 4

A mixture consisting of 38 parts of 2-hydroxyethyl acrylate, 32 parts of ethylene dimethacrylate and 12 parts of 2-(p-acetaminophenoxy)ethyl acrylate was polymerized in bulk in the presence of 1 part of dibenzoyl peroxide and 70 parts of dibutylether at 70° C. in a cylindrical mold. The resulting copolymer was hydrolyzed as in Example 3.

EXAMPLE 5

A mixture of 62 g. of ethylene oxide and 26.4 g. of p-acetaminophenol was heated in a pressure vessel formed of an alloy steel for 10 hours to 150° C. The oily product, after removing a small portion of unreacted ethylene oxide by distillation, had a weight of 65g. indicating an average of one molecule of p-acetaminophenol reacted with 5 molecules of ethylene oxide. By gel chromatographic analysis, it was determined that the mixture contained compounds with x from 4 to 9, primarily with $x = 5$. This oily product was mixed with 87 ml. of 2 N NaOH; under intensive stirring and cooling, there was added dropwise over 30 minutes 18.3 g. of methacryloylchloride at a temperature of 0° to 5° C. Following the addition of 100 ml. of ether, the upper layer was separated; and, after vaporization of the ether in vacuo, there was obtained a yellow viscous oil.

A mixture containing 5 parts of such viscous phenoxy product, 100 parts of 2-hydroxyethyl methacrylate, 50 parts of ethylene dimethacrylate, and 1 part of azobisisobutyronitrile was copolymerized in suspension in 1000 parts of water in the presence of 100 parts of cyclohexanol and 20 parts of lauryl alcohol under stirring at 70° C. for 12 hours. The resulting copolymer was washed with water, ethanol and benzene; and it was then hydrolyzed with a 3% NaOH solution at 100° C. for 3 hours, followed by drying at 40° C.

EXAMPLE 6

A solution consisting of 1 part of 2-p-acetaminophenoxy ethyl methacrylate, 10 parts of acrylamide and 1 part of dibenzoyl peroxide in 70 parts of carbon tetrachloride was heated under reflux conditions and vigorous stirring. The copolymer started to precipitate after several minutes; and the polymerization was substantially completed in one hour. The white powdery copolymer was separated by suction, washed with carbon tetrachloride, and dried. Saponification with boiling 2% sodium hydroxide resulted in total cleavage of the acetyl groups; a part of the amide groups of the acrylamide portion was also hydrolyzed at the same time.

EXAMPLE 7

A mixture consisting of 35 parts of 2-hydroxyethyl methacrylate, 35 parts of ethylene dimethacrylate, 20 parts of 2-(p-benzoylaminophenoxy)ethylacrylate, and 1 part of dibenzoyl peroxide in 100 parts of toluene was heated to a boil. The polymerization was finished after 5 hours; and the copolymer was separated in the form of fine white globules by suction. The hydrolysis of the copolymer was carried out in 5% KOH at 100° C. for 1 hour. The resulting polymeric material was characterized by its pore distribution, its high inner surface area, and the reactivity of its free amino groups.

What is claimed is:

1. A method of producing a polymeric material containing primary amino groups, which comprises copolymerizing (a) a monomer having the general formula:

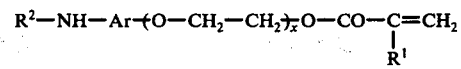

wherein
- $R^1$ is selected from the group consisting of H and $CH_3$,
- Ar is a bifunctional aromatic residue,
- $R^2$ is an acyl group, and
- $x$ is 1 to 20, and (b) an amount of a comonomer which is 2 to 30 times greater than the amount of said monomer by weight, said comonomer being selected from the group consisting of a hydroxyalkyl ester of acrylic acid, a hydroxyalkyl ester of methacrylic acid, an amide of acrylic acid, an amide of methacrylic acid, and styrene, the copolymerization being conducted at a temperature of 60° to 90° C; and treating the resulting copolymeric material at a temperature of 75° – 100° C. with a hydrolytic agent selected from the group consisting of a strong mineral acid and a strong mineral base to convert the acylamino groups into primary amino groups.

2. A method according to claim 1, in which the bifunctional aromatic residue is phenylene group.

3. A method according to claim 1, in which $R^2$ is an acetyl group.

4. A method according to claim 1, in which $R^2$ is a benzoyl group.

5. A method according to claim 1, in which the comonomer is a hydroxyalkyl ester selected from the group consisting of a hydroxyalkyl ester of acrylic acid and a hydroxyalkyl ester of methacrylic acid.

6. A method according to claim 1, in which the comonomer is an amide selected from the group consisting of an amide of acrylic acid and an amide of methacrylic acid.

7. A method of producing a polymeric material containing primary amino groups, which comprises copolymerizing (a) a monomer having the general formula:

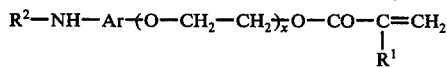

wherein
$R^1$ is selected from the group consisting of H and $CH_3$,
Ar is a bifunctional aromatic residue,
$R^2$ is an acyl group, and
$x$ is 1 to 20,
(b) an amount of a comonomer which is 2 to 30 times greater than the amount of said monomer by weight, said comonomer being selected from the group consisting of a hydroxyalkyl ester of acrylic acid, a hydroxyalkyl ester of methacrylic acid, an amide of acrylic acid, an amide of methacrylic acid, and styrene, and (c) up to 70% by weight, based on the total weight of said monomer and said comonomer, of a crosslinking agent selected from the group consisting of an ester containing at least two acryloyl groups, an ester containing at least two methacryloyl groups, an amide containing at least two acryloyl groups, an amide containing at least two methacryloyl groups, and divinyl benzene, the copolymerization being conducted at a temperature of 60° to 90° C.; and treating the resulting copolymeric material at a temperature of 75° – 100° C. with a hydrolytic agent selected from the group consisting of a strong mineral acid and a strong mineral base to convert the acylamino groups into primary amino groups.

8. A method according to claim 7, in which the copolymerization is carried out in the presence of an organic solvent in which the resulting copolymeric material is soluble.

9. A method according to claim 7, in which the copolymerization is carried out in the presence of an organic solvent from which the resulting copolymeric material is precipitated.

10. A method according to claim 7, in which the copolymerization is carried out in suspension form in the presence of water.

11. A method according to claim 7, in which the bifunctional aromatic residue is a phenylene group.

12. A method according to claim 7, in which $R^2$ is an acetyl group.

13. A method according to claim 7, in which $R^2$ is a benzoyl group.

14. A method according to claim 7, in which the comonomer is a hydroxyalkyl ester selected from the group consisting of a hydroxyalkyl ester of acrylic acid and a hydroxyalkyl ester of methacrylic acid.

15. A method according to claim 7, in which the comonomer is an amide selected from the group consisting of an amide of acrylic acid and an amide of methacrylic acid.

16. A method of producing a polymeric material containing primary amino groups, which comprises copolymerizing at a temperature of 60° to 90° C. (a) an aminoacrylate selected from the group consisting of 2-(p-acetaminophenoxy)-ethyl methacrylate and 2-(p-acetaminophenoxy)-ethyl acrylate, (b) an amount of a hydroxy-acrylate which is 2 to 30 times greater than the amount of said aminoacrylate by weight, said hydroxy-acrylate being selected from the group consisting of 2-hydroxyethyl methacrylate and 2-hydroxyethyl acrylate, and (c) up to 70% by weight, based on the total weight of said aminoacrylate and said hydroxy-acrylate, of a crosslinking agent selected from the group consisting of ethylene dimethacrylate and ethylene diacrylate; and treating the resulting copolymeric material at a temperature of 75° – 100° C. with a hydrolytic agent selected from the group consisting of a strong mineral acid and a strong mineral base to convert the indicated acetamino groups into primary amino groups.

17. A method of producing a polymeric material containing primary amino groups, which comprises copolymerizing at a temperature of 60° to 90° C. 2-(p-acetaminophenoxy)-ethyl methacrylate, an amount of 2-hydroxyethyl methacrylate which is 2 to 30 times greater than the amount of said aminomethacrylate by weight, and up to 70% by weight based on the total weight of said aminomethacrylate and said hydroxymethacrylate, of ethylene dimethacrylate; and treating the resulting copolymeric material at a temperature of 75° – 100° C. with hydrochloric acid to convert the acetamino groups into primary amino groups.

18. A polymeric material containing primary amino groups, produced by the method according to claim 1.

19. A polymeric material containing primary amino groups, produced by the method according to claim 7.

* * * * *